(12) United States Patent
Brandt, Jr.

(10) Patent No.: US 10,285,418 B2
(45) Date of Patent: May 14, 2019

(54) METHOD AND APPARATUS FOR SMOOTHING IRREGULAR PARTICULATE FLOW STREAM

(71) Applicant: Robert O Brandt, Jr., Wilmington, DE (US)

(72) Inventor: Robert O Brandt, Jr., Wilmington, DE (US)

( * ) Notice: Subject to any disclaimer, the term of this patent is extended or adjusted under 35 U.S.C. 154(b) by 187 days.

(21) Appl. No.: 14/994,260

(22) Filed: Jan. 13, 2016

(65) Prior Publication Data
US 2017/0196239 A1    Jul. 13, 2017

(51) Int. Cl.
| | |
|---|---|
| *A23K 40/30* | (2016.01) |
| *A23N 17/00* | (2006.01) |
| *A23K 50/30* | (2016.01) |
| *A23K 20/184* | (2016.01) |
| *B65G 53/66* | (2006.01) |

(52) U.S. Cl.
CPC ............ *A23K 40/30* (2016.05); *A23K 20/184* (2016.05); *A23K 50/30* (2016.05); *A23N 17/00* (2013.01); *B65G 53/66* (2013.01)

(58) Field of Classification Search
CPC ...................................................... A23K 40/30
See application file for complete search history.

(56) References Cited

U.S. PATENT DOCUMENTS

| | | | | |
|---|---|---|---|---|
| 3,186,602 A | * | 6/1965 | Ricciardi | ................. B65B 1/12 198/540 |
| 3,494,507 A | * | 2/1970 | Ricciardi | ............ G01G 11/003 177/121 |
| 3,561,643 A | * | 2/1971 | Kloven | ............... B01F 15/0216 222/240 |
| 4,111,272 A | * | 9/1978 | Ricciardi | ............. G05D 7/0605 177/121 |
| 4,733,971 A | * | 3/1988 | Pratt | .................... A01K 5/0216 141/107 |

(Continued)

*Primary Examiner* — Abbas Rashid
(74) *Attorney, Agent, or Firm* — Daniel Becker; Robert G. Rosenthal

(57) ABSTRACT

A system for converting an irregular flow stream of solid particulates into a continuously flowing stream of solid particulates is disclosed. The system comprises a bin adapted to receive the irregular particulate flow stream. A level sensor is adapted to produce an output signal representative of the volume of particulates in the bin. The bin level controller has a set point corresponding to a desired level for the volume of particulates in the bin and is adapted to receive the output signal from the level sensor. The bin level controller produces a bin level control signal proportional to the deviation from the set point signal. A movable valve is positioned proximate the outlet adapted to modulate the particulate flow stream out of the bin and a valve controller is operatively associated with the valve. The valve controller is adapted to respond to bin level control signals from the bin level controller. The bin level controller is constructed and arranged to operate the valve such that the volume of particulates remains at the bin set point level to ensure a constant stream of particulates out of the bin through the outlet. Once the particulate flow stream is continuous and measured, it may be subjected to further operations such as proportional coating or mixing of additional constituents.

2 Claims, 1 Drawing Sheet

(56) References Cited

U.S. PATENT DOCUMENTS

| | | | | |
|---|---|---|---|---|
| 5,116,634 A * | 5/1992 | Havens | ............... | A01D 41/1252 |
| | | | | 118/303 |
| 5,423,456 A * | 6/1995 | Arendonk | ............ | G01G 11/083 |
| | | | | 222/238 |
| 5,808,242 A * | 9/1998 | Satake | ....................... | G01F 1/58 |
| | | | | 177/16 |
| 6,007,236 A * | 12/1999 | Maguire | ................... | B01F 3/18 |
| | | | | 177/122 |
| 6,732,597 B1 * | 5/2004 | Brandt, Jr. | ............... | G01F 1/206 |
| | | | | 73/861.73 |
| 7,810,986 B2 * | 10/2010 | Landers | ................ | B01F 3/1228 |
| | | | | 366/137.1 |
| 8,092,070 B2 * | 1/2012 | Maguire | ................ | B01F 3/184 |
| | | | | 366/141 |
| 8,299,374 B2 * | 10/2012 | Brandt | ................ | G01G 11/003 |
| | | | | 177/1 |
| 9,181,138 B2 * | 11/2015 | LeSueur | ................ | C05F 17/00 |

* cited by examiner

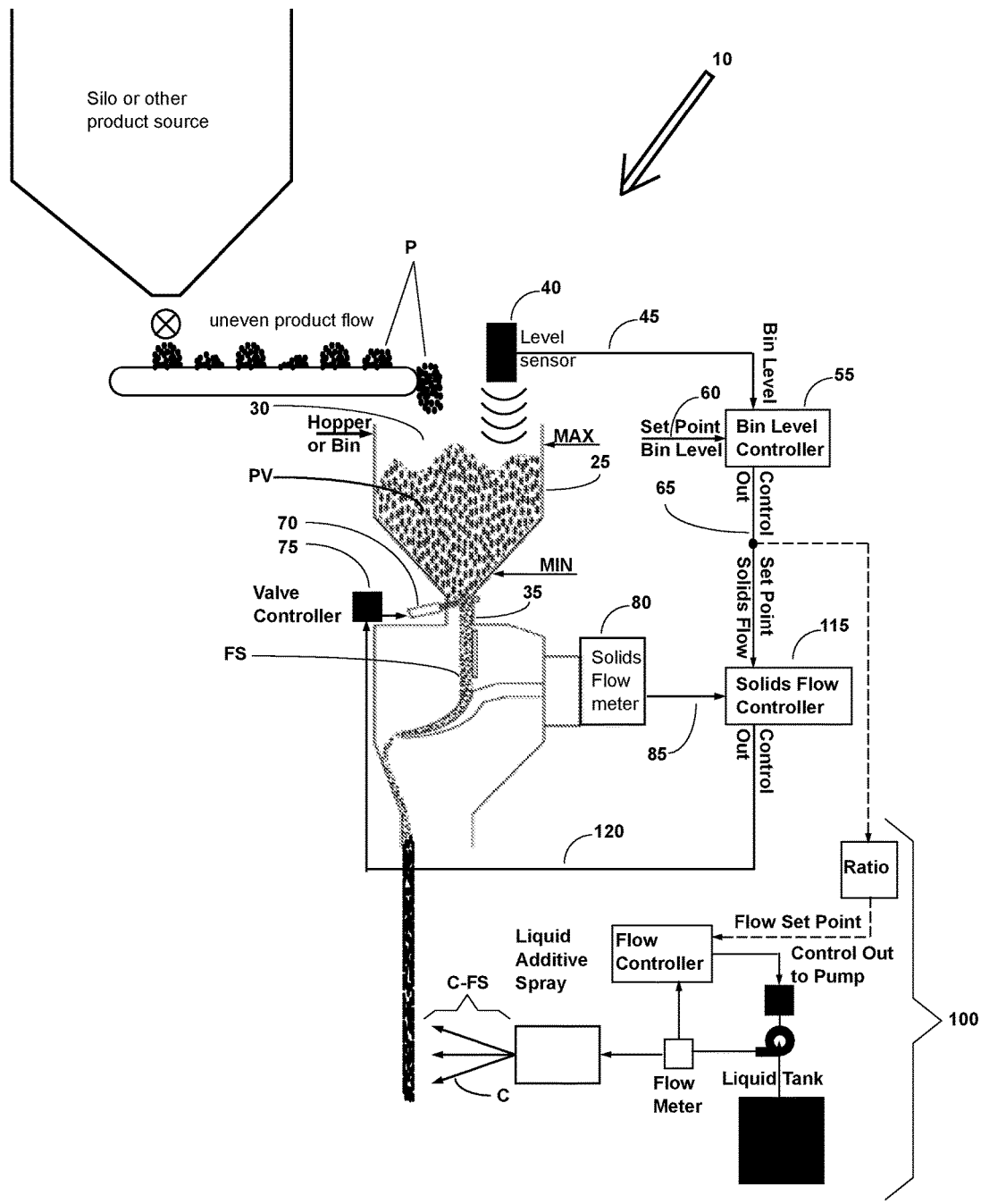

METHOD AND APPARATUS FOR SMOOTHING IRREGULAR PARTICULATE FLOW STREAM

FIELD OF THE INVENTION

This invention relates generally to the field of modulating an irregularly flowing stream of solid particulates, and more specifically, to a system for converting an irregularly flowing particulate flow steam into a continuously flowing particulate flow stream upon which a subsequent operation may be performed or to which additional products may be proportionately mixed.

BACKGROUND OF THE INVENTION

Products such as grain, animal feed (barley, corn, wheat, and animal products), cereal or other particulate materials are normally converted from bulk material into smaller portions for sale. Additionally, further processing of this bulk material is often required in order to have a saleable product. For example, animal feed may be coated with hormones (to enhance growth), fat (to enhance weight gain), vitamins (to maintain animal health) and antibiotics (to prevent disease). Another example of a bulk material which requires further processing is cereal for human consumption to which sugar, fruit, vitamins, or other grains are added. Also, granular plastic feedstock to extruders needs to be blended with color chips to give the proper color to the extruded product. These types of bulk materials are typically transported via conveyor or into a hopper for further processing. Inherent in the processing of bulk particulate material is that it is subject to irregular flow which, when subjected to further processing, results in the production of an uneven finished product. Variations can be on the order of twenty percent (20%) to as much as fifty percent (50%). While such variations are not a serious problem when large volumes of product are produced, over smaller volumes, such a wide variation results in a product that is not acceptable. For example, when hog feed is coated with growth hormones, and where the quantity of hormone ingested by hogs is necessary in order to meet a contracted sale weight, the variation in the coating means that there will be variations in how much growth hormone is ingested by hogs within the group, and therefore results in underweight animals. To overcome the under-ingestion of the hormones, more feed must be fed to the animals in order for them to reach the contracted sale weight, thus reducing producer profitability.

In view of the foregoing, it is an object of the present invention to provide a system that overcomes the disadvantages of the current production methods and systems.

It is a further object to provide a system that converts an irregularly flowing stream of particulates into a continuously flowing stream of particulates.

Another object of the present invention is to provide a method and apparatus for effectively coating a continuously flowing stream of particulates with the correct amount of said coating.

Yet another object of the present invention is to continuously measure the mass of the continuous flow stream and to integrate this information with other processes to produce a finished product within the preselected specifications.

SUMMARY OF THE INVENTION

To accomplish the foregoing objects, this is the provided system for converting an irregular flow stream of solid particulates into a continuously flowing stream of solid particulates. The system comprises a bin adapted to receive the irregular particulate flow stream having an inlet and an outlet; a level sensor adapted to produce an output signal representative of the volume of particulates in the bin; a bin level controller having a set point corresponding to a desired level for the volume of particulates in the bin and adapted to receive the output signal from the level sensor and wherein the bin level controller produces a bin level control signal proportional to the deviation from the set point signal. A movable valve is positioned proximate the outlet adapted to modulate the particulate flow stream out of the bin and a valve controller is operatively associated with the valve. The valve controller is adapted to respond to bin level control signals from the bin level controller and the bin level controller being constructed and arranged to operate the valve such that the volume of particulates remains at the bin set point level to ensure a constant stream of particulates out of the bin through the outlet.

BRIEF DESCRIPTION OF THE DRAWING

FIG. 1 shows the flow-smoothing and coating system according to the present invention.

DETAILED DESCRIPTION OF THE PREFERRED EMBODIMENT

While the present invention will be described more fully hereinafter with reference to the accompanying drawings, in which a particular embodiment is shown, it is to be understood at the outset that persons skilled in the art may modify the invention herein described while still achieving the favorable results of this invention. Accordingly, the description which follows is to be understood as being a broad teaching disclosure directed to persons of skill in the appropriate arts and not as limiting upon the present invention.

Referring to FIG. 1, what is shown is a system generally indicated at 10 for converting an irregular flow of solid particulates P into a continuously flowing flow stream FS of solid particulates.

The system 10 comprises a bin 25, with an inlet 30 and an outlet 35, a level sensor 40, a bin level controller 55, a solids flow meter 80, a solids flow controller 115, a valve 70, a valve controller 75, and a coating station 100. The system also works with respect to a coating C, as its own coating flow stream, C-FS.

The system 10 is fed the irregular input flow P of solid particulates, which is received into the inlet 30 of a bin 25. The bin 25 is adapted to accumulate the solid particulates of the irregular flow P into a particulate volume PV, and smoothly release the solid particulates out of an outlet 35. The solid particulates are gravity fed to pass through the outlet 35 as a smoothed and continuously flowing stream FS of solid particulates.

In order to ensure that the volume PV of solid particulates in the bin 25 does not completely pass through the outlet 35 and thus empty the bin, nor overflow the inlet 30, the system 10 has a level sensor 40, which detects the level of the volume PV of solid particulates in the bin 25. Level sensors are well known in the art and may be ultrasonic, capacitance, radar or weight measuring load cell based. The level sensor 40 then produces an output signal 45 representing the detected level of the volume PV of particulates in the bin 25. The level sensor 40 acts to ensure that the PV in bin 35 remains between preselected high and preselected low limits.

The signal 45 from level sensor 40 is received by a bin level controller 55. The bin level controller 55 includes a set point signal 60 that corresponds to the desired or optimum level of solid particulates to be maintained for the volume PV within the bin 25. The set point level signal 60 can be preselected to represent an amount of solid particulates which ensures that the flow stream FS of solid particulates flows continuously from the outlet 35, without emptying or overflowing the bin 25.

The bin level controller 55 compares signal 45 (from the level sensor 40) with the set point signal 60. The bin level controller 55 then produces from the comparison an output signal, hereafter "bin level control signal" 65 that is proportional to the deviation of the two input signals, the deviation of signals 45, 60.

A solids flow meter 80 is operatively associated with outlet 35 and continuously measures the flow of the particulate flow stream FS from said outlet 35. The solids flow meter 80 is adapted to produce an output signal 85 proportional to the rate of flow of the flow stream FS of solid particulates passing through the solids flow meter 80. Thus, if the flow rate of the flow stream FS is constant, the output signal 85 remains constant. Conversely, if the flow rate of the flow stream FS decreases, the output signal 85 decreases, and vice-versa.

The output signal 85 (from the solids flow meter 80) is received by a solids flow controller 115. The solids flow controller 115 receives the bin level control signal 65 as its set point signal. The solids flow controller 115 then compares the output signal 85 from the solids flow meter 80 with the bin level control signal 65 and produces an output signal 120 that is proportional to the deviation of the output signal 85 from the set point signal of the solids flow controller bin level control signal 65.

The system 10 modulates the flow rate of the continuously flowing stream FS passing out of the outlet 35 with a movable valve 70. The system 10 controls the valve 70 with a valve controller 75. The valve controller 75 is adapted to respond to the output signal 120 from the solids flow controller 115. In response to the output signal 120, the valve controller 75 operates to move the valve 70 to modulate the rate of flow of the flow stream FS.

The operation of the system 10 enables a cascade control loop with respect to the above components. The cascade control loop is performed by the following stepwise logic. The desired level of the particulate volume PV in bin 25 is set by set point signal 60. Changes in signal 45 with respect to the set point 60 produces an output signal 65 from the bin level controller 55 that is proportional to the change in the particulate level in the bin 25.

The particulate P flows out of bin 25, through valve 70, and on to solids flow meter 80. Solids flow meter 80 produces an output signal that is proportional to the change in the flow rate of particulate flow stream exiting the bin 25. Thus, an evenly flowing particulate stream produces a constant output signal from flow meter 80. It will be noted that the measurement of the flow steam of particulates out of bin 25 is a continuous measurement and that at any instant a change in rate will produce a corresponding change in the output signal from the solids flow meter 80 at output 85. One solids flow meter which may be used in connection with the present invention is disclosed in U.S. Pat. No. 5,219,031. Notwithstanding the foregoing, other solids flow meters well known to those skilled in the art may be employed.

It will be noted that up to this point, the point of the discussion and the elements discussed is to maintain the particulate in the bin between predetermined high and low limits and further, that the particulate flow out of the bin 25 is adjusted (increased, decreased, or remains unchanged) in order to accomplish this. In order to accomplish the foregoing, a desired bin level set point 60 is established and is one of the inputs to bin level controller 55. The other input to bin level controller 55 is the output 45 from bin level sensor 40. One of the functions of bin level controller 55 is to act as a comparator that outputs signal 65 that is proportional to the deviation of the bin level from the desired bin level as determined by the set point 60.

As particulate flow through solids flow meter 80, an output signal indicative of the mass of the particulate flowing there across over time. As stated herein above, the output signal 85 changes with the instantaneous change in the flow rate and this signal 85 is input to solids flow controller 115. Thus, solids flow controller 115 compares the actual instantaneous flow rate of particulate out of the bin with the changes in bin level and inputs a signal 120 to valve controller 75 that opens or closes (modulates) valve 70 to maintain the system in equilibrium.

The system 10 may also be employed to produce a stream of coated solid particulates. A coating station 100 is adapted to coat the particulates in the flow stream FS-PBC passing by the coating station 100 with a coating C. The station 100 applies coating C as a second flow stream C-FS. The coating station 100 is adapted to modulate the rate of flow of the flow stream C-FS to be in proportion to a desired ratio with respect to a set point signal. The coating station 100 receives, as a set point signal, the bin level control signal 65.

As a result, the second flow stream C-FS is blendedly associated with the stream FS that is exiting the solids flow meter 80. Therefore, the flow stream of solid particulates FS-PBC is a flow stream that maintains the desired ratio of coating that results from the flow stream FS (exiting the solids flow meter 80) being blendedly associated with the second flow stream C-FS (of spray coating C).

While the FIGURE illustrates a liquid coating being applied to the particulate flow stream, it will be noted that solid particles or granules may also be mixed, or any combination of liquids and solid particles in with the flow stream. Additionally, multiple flow steams may be moving in parallel, each being modulated to maintain a desired mixture. For example, a cereal mixture may contain oats, wheat, fruit, or other grains in multiple parallel flow streams that are collectively controlled for the desired proportions of each is achieved.

The foregoing embodiment is to be considered illustrative, rather than restrictive of the invention, and those modifications which come within the meaning and range of equivalence of the claims are to be included therein.

I claim:

1. An apparatus for coating a continuous irregular flow stream of solid particulates wherein the flow stream is smoothed such that over a preselected time period coating of the particulates is achieved within preselected limits and comprising:

a bin adapted to receive the irregular particulate flow stream having an inlet and an outlet;

a level sensor adapted to produce an output signal representative of the level of particulates in said bin;

a bin level controller having a set point signal corresponding to a desired bin set point level of particulates in said bin and adapted to receive the output signal from said level sensor and wherein said bin level controller compares the output signal from the level sensor with the set point signal, the comparison defining a deviation from the set point signal, and produces a bin level control signal proportional to the deviation from said set point signal;

a movable valve positioned proximate the outlet adapted to modulate the particulate flow stream out of the bin;

a valve controller operatively associated with said valve, said valve controller adapted to respond to bin level control signals from said bin level controller;

said bin level controller being constructed and arranged to operate the valve such that the level of particulates remains at the bin set point level to ensure a constant stream of particulates out of the bin through said outlet;

a solids flow meter operatively associated with said outlet and adapted to produce an output signal proportional to the flow rate of the flow stream of solid particulates through said solids flow meter;

a spray coating station adapted to coat the particulates in the flow stream with a spray coating;

a solids flow controller, wherein said bin level controller is operatively associated with a cascade control loop such that the bin level control signal defines a set point signal for the solids flow controller and wherein the solids flow controller produces an output signal, wherein the output signal of said solids flow controller controls the valve controller which sets the valve to maintain the flow stream of solid particulates out of said bin; and wherein said spray coating is modulated to be proportional to a coating station set point signal, the coating station being adapted to receive, as a coating station set point signal, the bin level control signal.

2. The apparatus according to claim 1 wherein said level sensor is selected from the group comprising ultrasonic sensors, capacitance sensors, radar sensors or load cells measuring the weight of said bin.

\* \* \* \* \*